US005534959A

United States Patent [19]
Keelan et al.

[11] Patent Number: 5,534,959
[45] Date of Patent: Jul. 9, 1996

[54] FILM PLANE ROTATION IN RIGID CAMERAS FOR DEPTH OF FIELD AND PERSPECTIVE CONTROL

[75] Inventors: Brian Keelan, Rochester; Daniel Pagano, Henrietta, both of N.Y.

[73] Assignee: Eastman Kodak Company, Rochester, N.Y.

[21] Appl. No.: 251,888

[22] Filed: Jun. 1, 1994

[51] Int. Cl.⁶ .......................... G03B 17/02; G03B 19/12
[52] U.S. Cl. .......................... 354/160; 354/152; 354/177
[58] Field of Search .................................. 354/152, 160, 354/177

[56] References Cited

U.S. PATENT DOCUMENTS

| | | | |
|---|---|---|---|
| 2,301,921 | 11/1942 | Willcox | 95/50 |
| 2,974,574 | 3/1961 | Bohm et al. | |
| 3,182,577 | 5/1965 | Ohnaka | 95/50 |
| 3,864,712 | 2/1975 | von Stwolinski | |
| 4,564,277 | 1/1986 | Koch et al. | 354/160 |
| 4,692,007 | 9/1987 | Vogt | 354/160 |
| 4,763,147 | 8/1988 | Vogt | |
| 5,027,143 | 6/1991 | Clark, III et al. | 354/160 |
| 5,289,215 | 2/1994 | Clairmont et al. | |

Primary Examiner—Michael L. Gellner
Assistant Examiner—Daniel G. Chapik
Attorney, Agent, or Firm—Francis H. Boss, Jr.

[57] ABSTRACT

A rigid camera with a film holder independently rotatable about a horizontal axis and a vertical axis. The film holder rotates synchronously with the focusing plate of the viewfinder. The focusing plate rotates independently about a first horizontal axis parallel to the horizontal axis of the film holder when the film holder rotates about its horizontal axis, and about a second horizontal axis perpendicular to its first axis when the film plane rotates about its vertical axis.

19 Claims, 10 Drawing Sheets

FILM PLANE ROTATION IN RIGID CAMERAS FOR DEPTH OF FIELD AND PERSPECTIVE CONTROL

BACKGROUND OF THE INVENTION

1. Technical Field

The present invention generally relates to cameras that compensate for undesired visual effects. More particularly, the present invention relates to rigid cameras that control perspective and depth of field.

2. Background Art

For some time now, bellows-type view cameras have been used to tailor the perspective and depth of field to the individual scene. In many cases, these bellows-type view cameras provide photographs not possible with rigid cameras; that is, cameras without a flexible bellows connecting the lens and film planes. As is known in the camera arts, bellows-type view cameras have the capability to raise and lower the lens plane relative to the film plane and vice-versa. In addition, the lens plane and/or film plane can be tilted.

In operation, translating the film or lens plane changes the field of view while maintaining constant depth of field. Tilting the film or lens plane alters the orientation and shape of the depth of field volume, but does not affect the field of view. Lens movements do not affect perspective, but require high lens coverage to avoid vignetting. In contrast, film plane movements do affect perspective, but do not require high lens coverage.

Although bellows-type view cameras control perspective and depth of field, they are expensive and generally only used by professional photographers, due to their cumbersome nature compared to rigid cameras. Attempts have been made to provide some of these control features in rigid cameras. One solution has been what are known as perspective control lenses or shift lenses. These types of lenses provide large coverage and built-in translational adjustment. However, perspective control lenses are expensive and often have inferior features relative to conventional lenses, for example, fixed focal length and manual aperture adjustment. Another solution has been to provide lenses for rigid cameras with both translation and tilt capabilities. However, these lenses are extremely expensive and the tilt feature is in one direction only.

Thus, a need exists for cost effective control of perspective and depth of field in rigid cameras.

SUMMARY OF THE INVENTION

Briefly, the present invention satisfies the need for cost effective perspective and depth of field control in rigid cameras by providing a rigid camera with a rotatable film holder and a correspondingly rotatable focusing plate.

In accordance with the above, it is an object of the present invention to provide a rigid camera that controls perspective.

It is another object of the present invention to provide a rigid camera that controls depth of field.

It is still another object of the present invention to provide a rigid camera with a rotatable film holder and a rotatable focusing plate.

It is another object of the present invention to provide a rigid camera with a synchronously rotatable film holder and focusing plate.

It is also an object of the present invention to provide a rigid camera with a film holder rotatable on both a vertical axis and a horizontal axis, and a focusing plate rotatable on two horizontal axes perpendicular to one another.

It is yet another object of the present invention to provide a rigid camera with a film holder rotatable on two perpendicular axes in the film plane and a focusing plate rotatable on two perpendicular axes synchronously with the film holder.

In accordance with the above objects, in a first aspect of the present invention, a rigid camera is provided including a film holder. The rigid camera comprises means for rotating the film holder about a first axis to control perspective and depth of field, and means for independently rotating the film holder about a second axis perpendicular to the first axis to control the perspective and depth of field. Where the rigid camera further includes a focusing plate, the camera further comprises means for rotating the focusing plate about a third axis in correspondence with rotation of the film holder about the first axis, and means for independently rotating the focusing plate about a fourth axis perpendicular to the third axis in correspondence with rotation of the film holder about the fourth axis.

In a second aspect of the present invention, a method is provided for controlling perspective and depth of field in a rigid camera including a film holder and focusing plate. The method begins by preparing to take a photograph with the rigid camera. Once the photograph is set up, the film holder is rotated about a first axis, and the focusing plate is rotated about a second axis in correspondence therewith. The method may further comprise rotating the film holder about a third axis perpendicular to the first axis, and rotating the focusing plate about a fourth axis perpendicular to the second axis in correspondence therewith.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
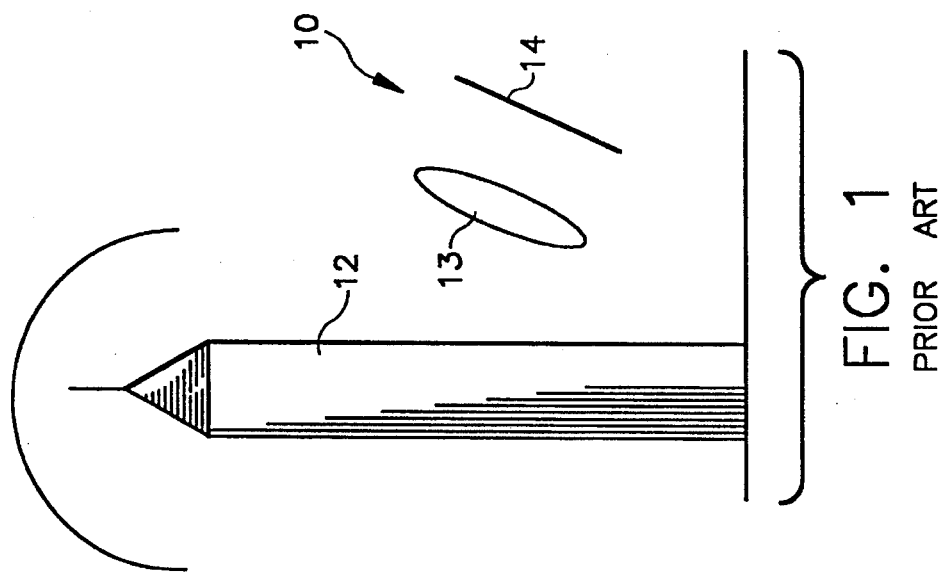
FIG. 1 is a block diagram of a prior art rigid camera photographing a building.

FIG. 1 is a block diagram of a conventional rigid camera 10 used to photograph a building 12. Camera 10 comprises lens 13 and film holder 14. In the context of the present invention, the term "rigid camera" refers to any camera having a camera body with a lens attachment plane 49' (FIG. 6) which is spatially fixed in relation to the remainder of the camera body 49; for example, a 35 mm camera, as opposed to large-format type cameras having a bellows. Also, the term "film holder" refers to any type of mechanism used to hold the portion of the film to be exposed in place during exposure. In addition, the term "focusing plate" refers to any type of mechanism used to enable viewing of the subject to be photographed through a viewfinder. Camera 10 is being used to photograph building 12 from ground level. Since building 12 is so tall, camera 10 must be tipped upward to fit in the top of building 12. This tilting necessarily also tilts film holder 14 in relation to building 12. Since film holder 14 and building 12 are not parallel, the sides of building 12 will converge in the photograph, an effect undesirable in many applications.

Figure 2:
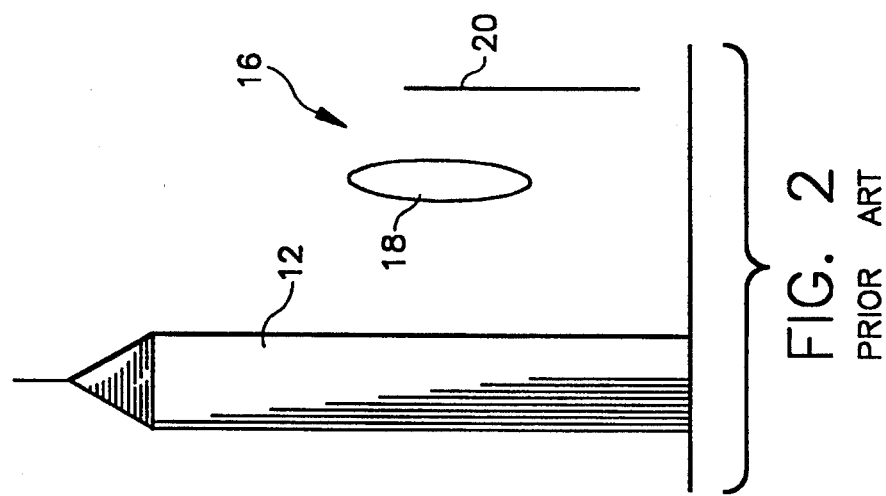
FIG. 2 is a block diagram of a prior art camera with a perspective control lens photographing the building of FIG. 1.

One solution for this perspective problem in the past has been to use expensive perspective control lenses, also referred to as shift lenses. FIG. 2 is a block diagram of a camera 16 with such a lens 18. Film holder 20 need not be tilted, as lens 18 is translated upwards to include the top of building 12 and the photograph is taken obliquely.

Figure 3:
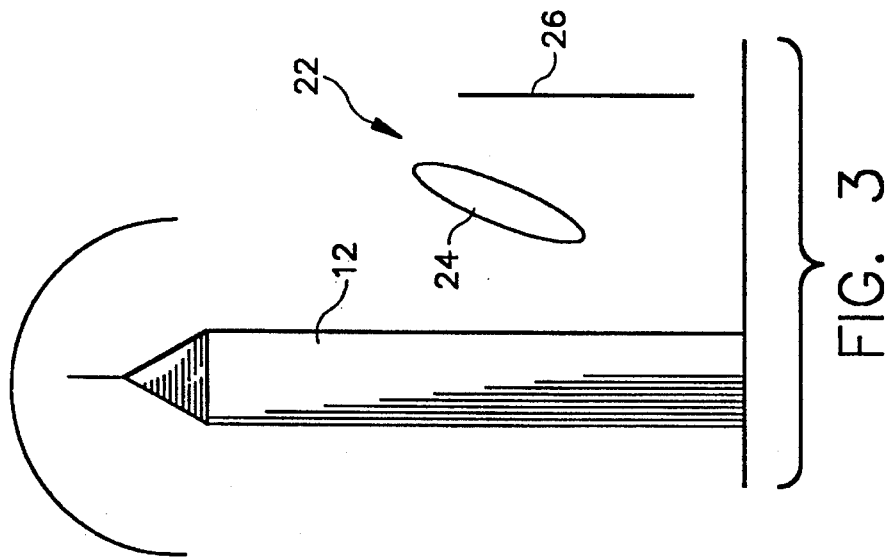
FIG. 3 is a block diagram of a rigid camera according to the first aspect of the present invention photographing the building of FIG. 1.

The present invention solves the perspective problem without the need for an expensive lens having limited features. FIG. 3 is a block diagram of a rigid camera 22 according to a first aspect of the present invention used to photograph building 12. While camera 22 is tipped back like camera 10 in FIG. 1, film holder 26 rotates to remain parallel with building 12 to eliminate undesired perspective effects. Thus, the present invention is a practical solution to the perspective problem and, as will be explained in more detail subsequently, is a practical solution for control of undesired depth of field effects.

Figure 4:
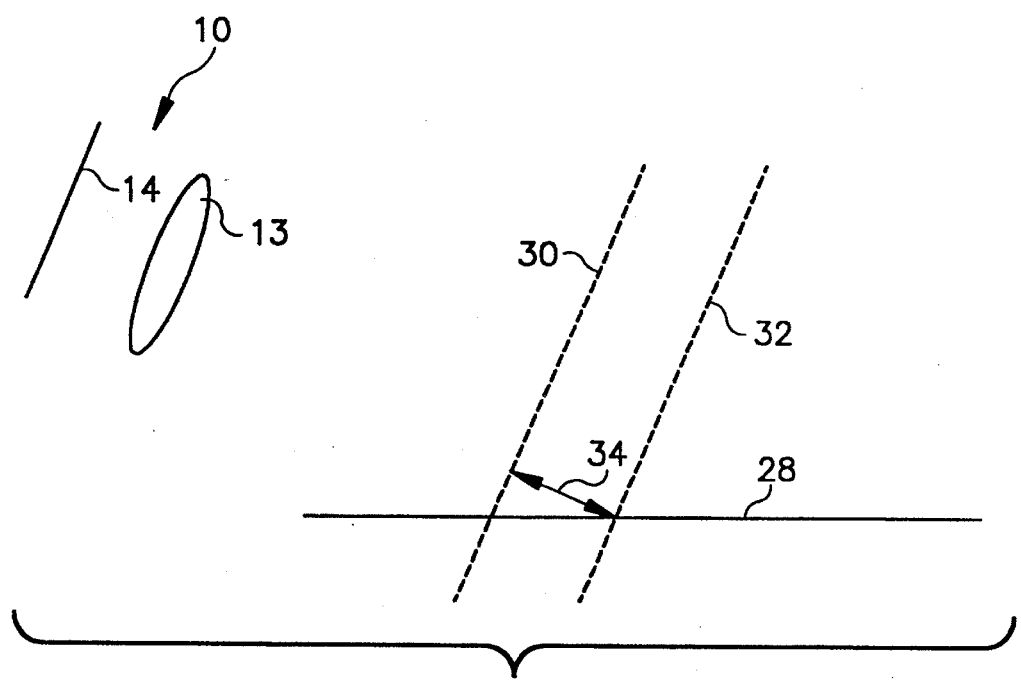
FIG. 4 is a block diagram of the depth of field for the camera of FIG. 1 in relation to a surface to be photographed.

FIG. 4 is a block diagram of prior art rigid camera 10 of FIG. 1 used to photograph surface 28. With camera 10, the depth of field volume is contained between planes 30 and 32, both parallel to film holder 14 and lens 13, and separated by a distance 34 referred to as the depth of field. Since the photograph is being taken at an oblique angle, the depth of field is canted relative to surface 28, causing the overlap between the depth of field and the subject surface to be poor. To increase the surface area coverage of surface 28, lens 13 could be stopped down. However, stopping down may increase the shutter time, leading to fuzziness and flare.

Figure 5:
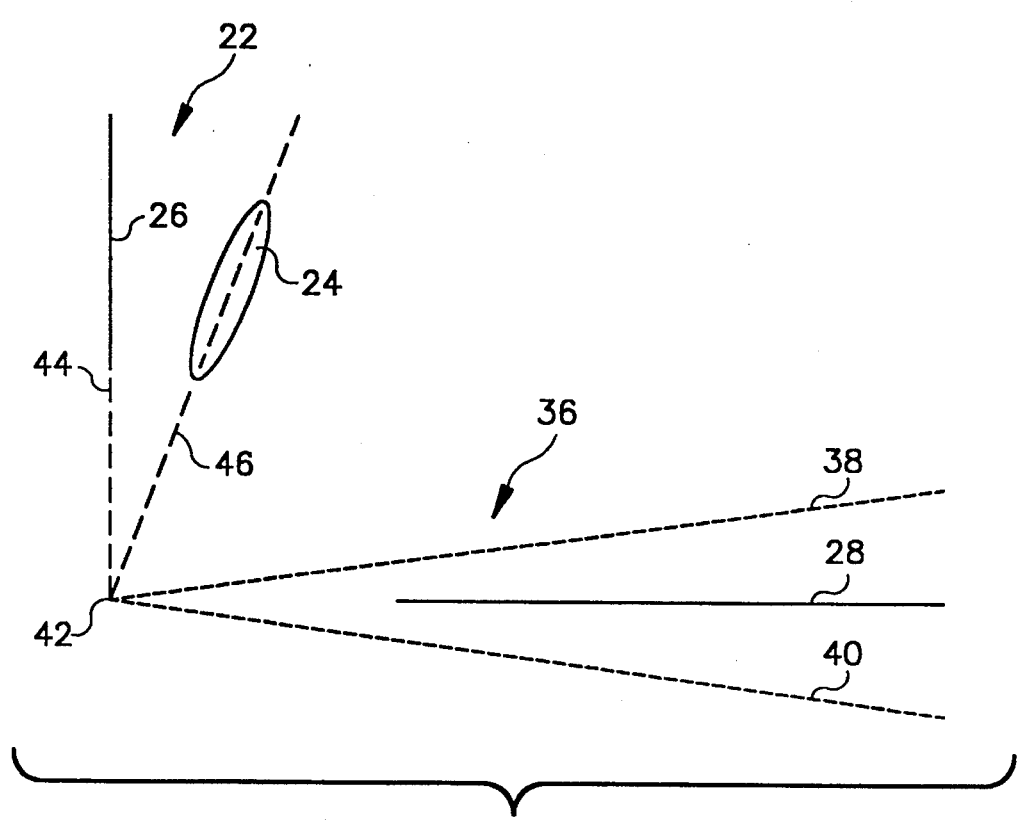
FIG. 5 is a block diagram of the depth of field for the camera of FIG. 3 in relation to the surface of FIG. 4.

The present invention provides an alternative way to capture a larger surface area of surface 28. FIG. 5 is a block diagram of rigid camera 22 of FIG. 3, according to the first aspect, used to photograph surface 28. With film holder 26 rotated into a vertical position and lens 24 tilted with camera 22, the depth of field becomes an infinite wedge 36 bounded by lines 38 and 40, with the vertex 42 coincident with the intersection of line 44, a planar extension of film holder 26, and line 46, a planar extension through lens 24. The depth of field extension available with the present invention has only previously been available by the addition of an accessory bellows, compromising rigidity and convenience.

Figure 6:
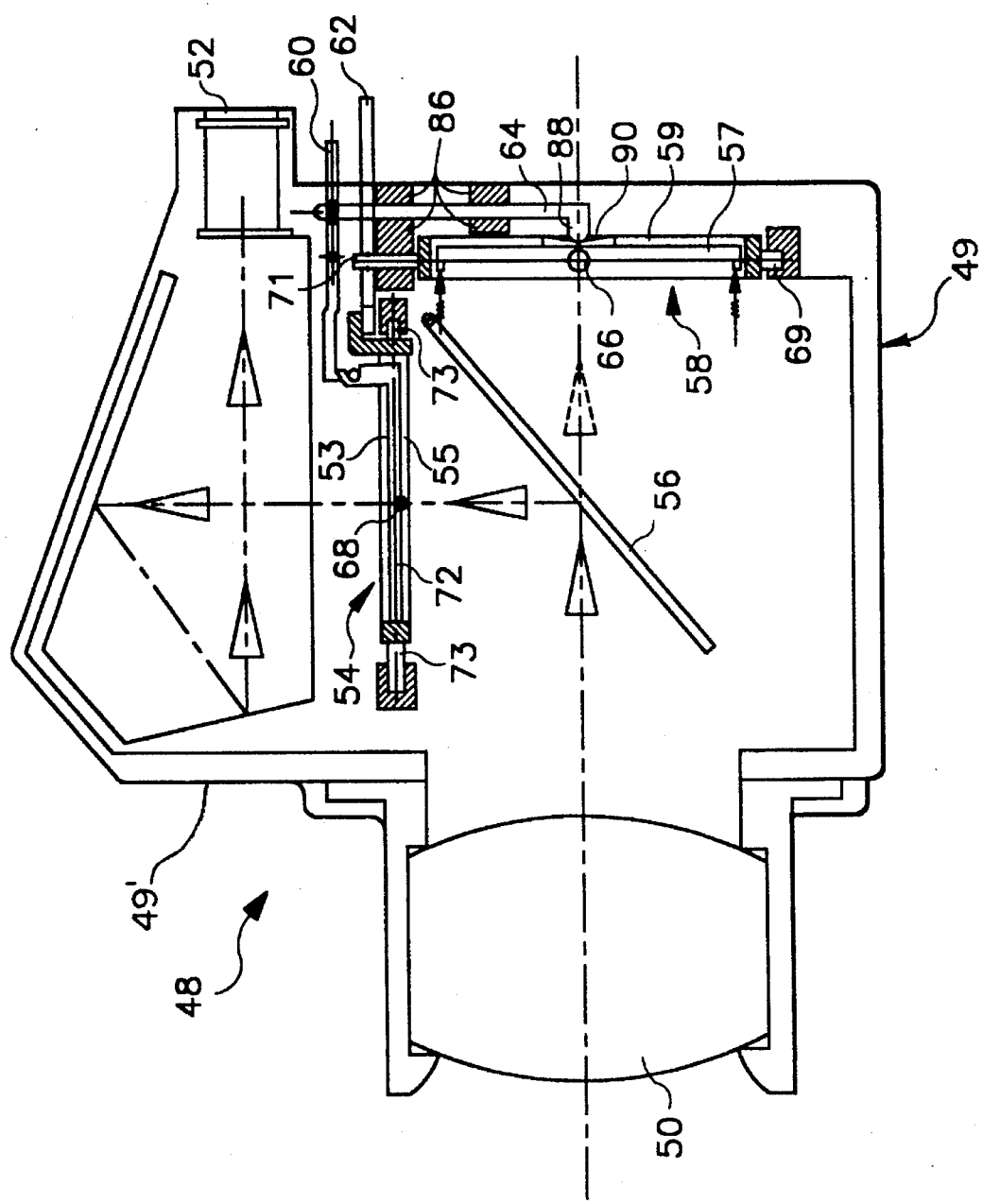
FIG. 6 depicts a left-side cross-sectional view of a rigid camera according to the first aspect of the present invention with the film holder and focusing plate in the normal position.

FIG. 6 depicts a left-side cross-sectional view of an exemplary embodiment of a rigid camera 48 according to the first aspect of the present invention. Camera 48 includes lens 50, viewfinder 52, focusing plate 54 (including ground glass plate 53 and plate yoke 55), mirror 56, film holder 58 (including film gate 57 and gate yoke 59), vertical lever 60, horizontal lever 62 and sliding lever 64. As shown in FIG. 6, film holder 58 and focusing plate 54 are in their normal position, that is, no control of perspective or depth of field is taking place in the normal position.

The operation of camera 48 will now be described. The purpose of the present exemplary embodiment is to provide rotation of film holder 58 and focusing plate 54 equally about the center of the image areas. This rotation may be about any axis contained in the plane of the film holder and focusing plate, i.e., horizontal, vertical or a combination thereof. To change the vertical angle of film holder 58, that is, to rotate gate 57 about horizontal axis 66 (comprising pivots 65 and 67, shown in FIG. 9), vertical lever 60 is moved up or down. Movement of vertical lever 60 also causes rotation of ground glass plate 53 about horizontal axis 68. To change the horizontal angle of film holder 58, that is, to rotate gate yoke 59 (and gate 57 connected thereto) about vertical axis 70 (comprised herein of pivots 69 and 71), horizontal lever 62 is moved left or right. Movement of horizontal lever 62 also causes rotation of plate yoke 55 (and plate 53 connected thereto) about horizontal axis 72 (comprised herein of pivots 71 and 73), which is perpendicular to horizontal axis 68. Although the present exemplary embodiment includes a manual lever mechanism, one skilled in the art will know how to replace the manual lever mechanism with motors, gearing and switching, an example of which will be generally described subsequently.

Figure 7:
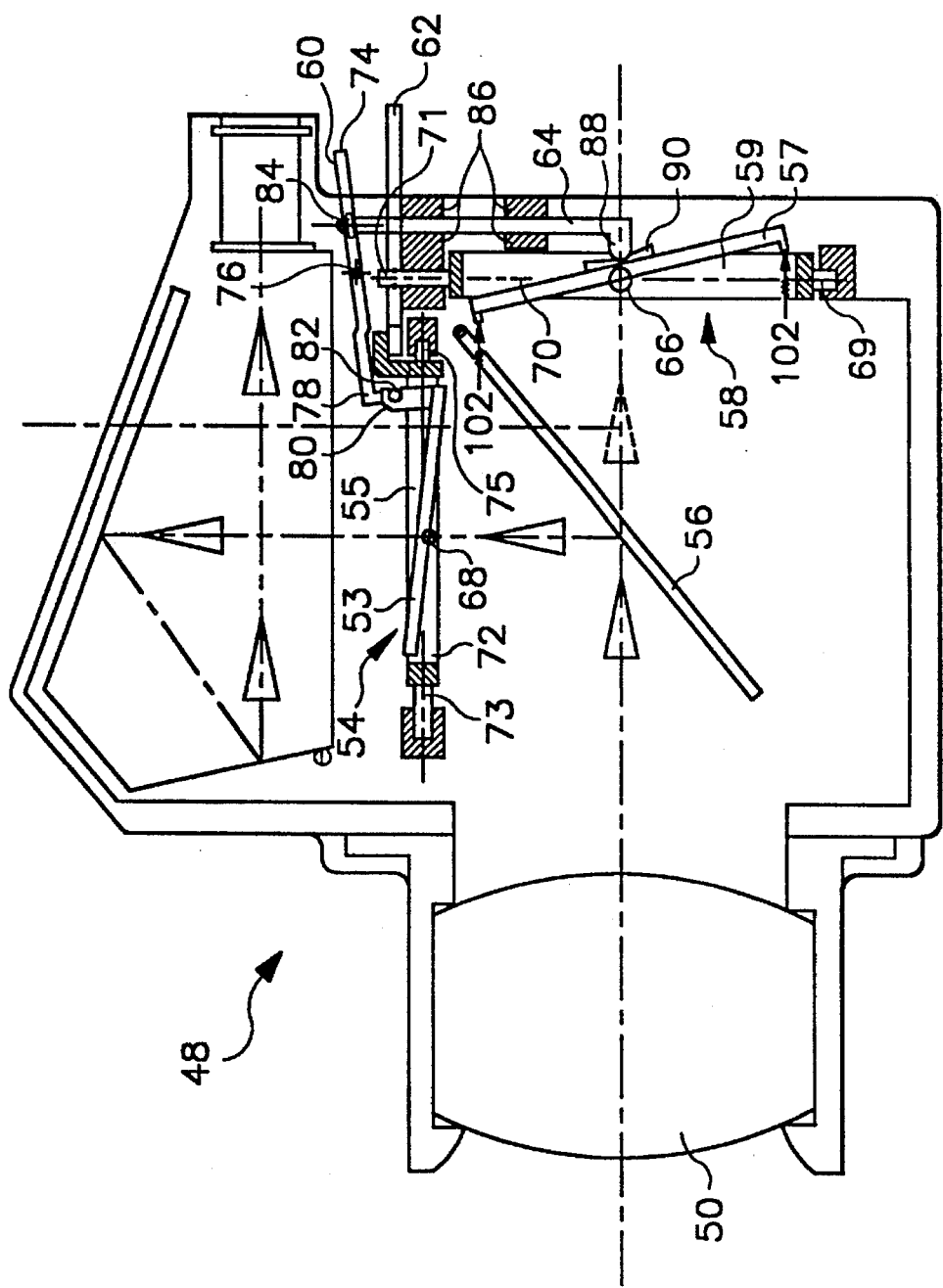
FIG. 7 depicts the camera of FIG. 6 with the film holder and focusing plate in a position to control perspective and depth of field.

A description of rigid camera 48 operating to control perspective and depth of field will now be provided with respect to FIG. 7. In FIG. 7, vertical lever 60 has been moved up, causing film gate 57 to rotate counterclockwise and plate 53 to rotate clockwise. When vertical lever 60 is pushed upward at end 74, it pivots about pin 76, lowering end 78. Lever end 78 and hook 80, part of plate 53, are movably connected via pin 82. Pushing up end 74 of lever 60 also raises sliding lever 64, connected to vertical lever 60 via pin 84, through guides 86. As sliding lever 64 is raised, cam follower 88 at the lower end thereof pushes on ramp 90, forcing film gate 57 to rotate about horizontal axis 66. In this manner, plate 53 and film gate 57 are synchronously rotated in opposite directions, as required for viewfinder 52 to properly reflect, through focusing plate 54, the change in perspective and depth of field due to rotation of film holder 58. It will be understood that to rotate film gate 57 clockwise and plate 53 counterclockwise, vertical lever 60 would be pushed downward instead of upward.

Figure 8:
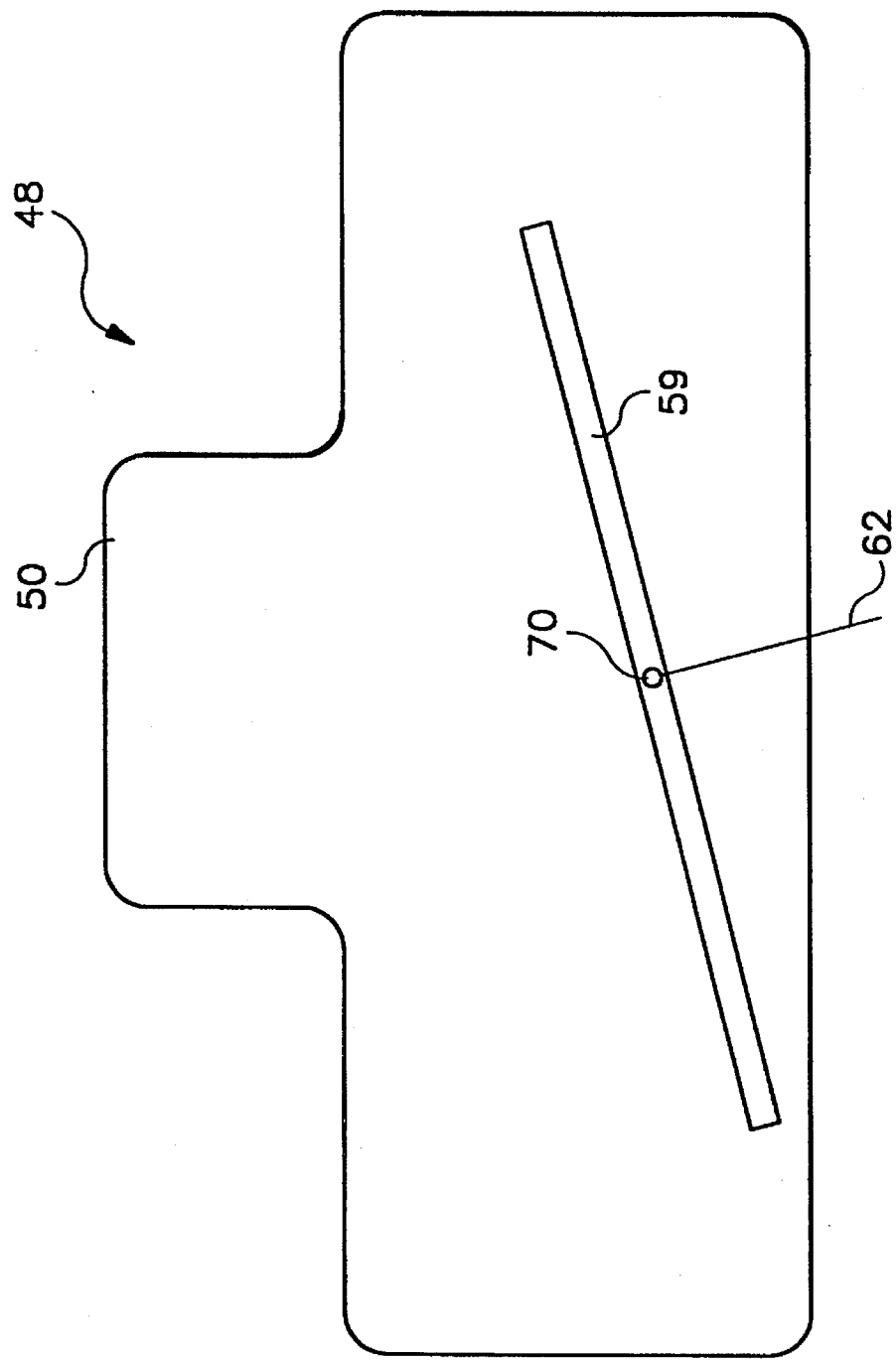
FIG. 8 is a block diagram of a top view of the camera of FIG. 7 with the film holder rotated about a vertical axis.
Figure 9:
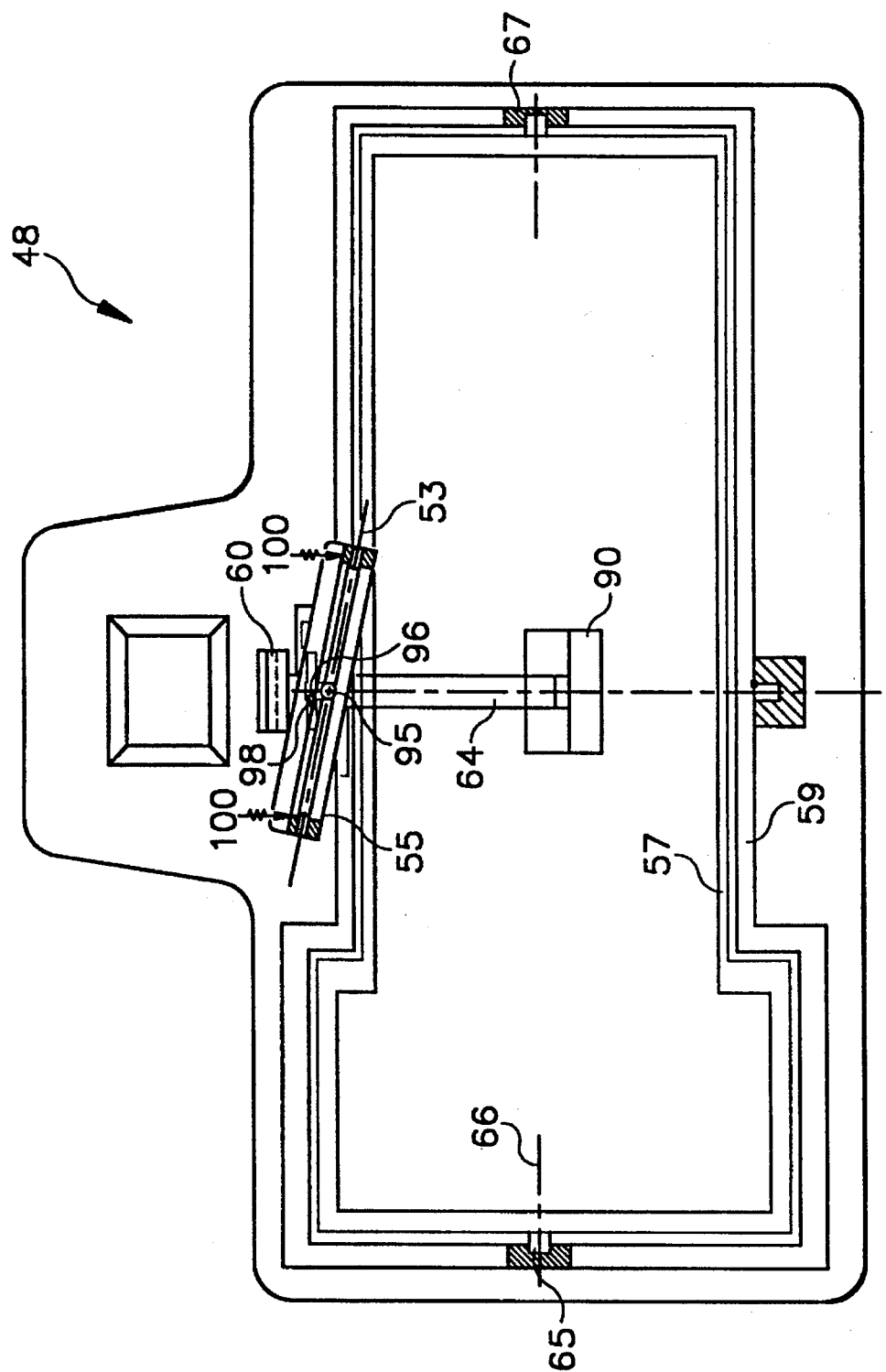
FIG. 9 depicts a rear view of the camera of FIG. 8 with the focusing plate rotated about a second horizontal axis perpendicular to the first.

FIGS. 8 and 9 taken together show the operation of camera 48 with respect to rotation of film gate yoke 59 and focusing plate yoke 55 due to movement of horizontal lever 62. FIG. 8 is a top view of camera 48 in block diagram form, including lens 50, horizontal lever 62, yoke 59 encasing film gate 57, and vertical axis 70. As shown in FIG. 8, when lever 62 is moved to the right, yoke 59 (and film gate 57 encased thereby) rotates counterclockwise about vertical axis 70, since lever 62 is fixedly attached to vertical axis 70, which is also fixedly attached to yoke 59. To ensure that ramp 90 and cam follower 88 remain in intimate contact, spring force 102 is maintained against both ends of film gate 57.

FIG. 9 is a rear view of camera 48 depicting the effect of the movement of vertical lever 62 on focusing plate 54. Through a cam follower 96 and ramp 98 arrangement similar to that for film holder 58, movement of horizontal lever 62 to the right causes focusing plate yoke 55 (and plate 53 encased thereby) to rotate clockwise about horizontal axis 95. As with the cam follower/ramp arrangement for film holder 58, a light spring force 100 is maintained at either end of plate 53 to ensure contact between cam follower 96 and ramp 98.

Figure 10:
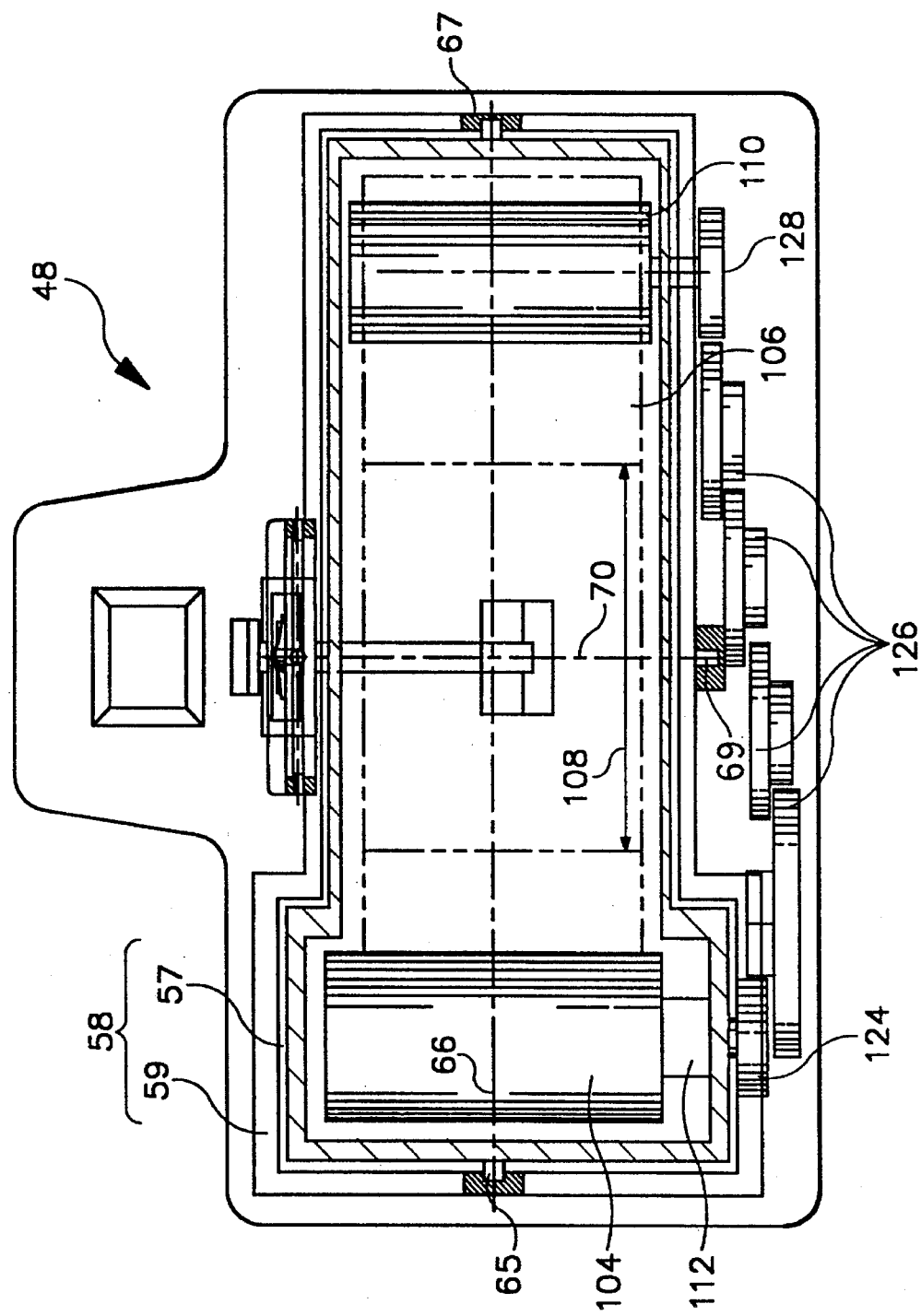
FIG. 10 depicts the camera of FIG. 9 with film cartridge, gearing and takeup spool.

FIG. 10 depicts camera 48 from FIG. 9 with a film cartridge 104 therein. The term "film cartridge" as used herein is meant to be interpreted to include roll film (120 format) on a spool that is wrapped with paper to provide light protection in addition to film enclosed within a cartridge proper. Film 106 extends from film cartridge 104 over film exposure area 108 and into takeup spool 110. Movement of film 106 is accomplished via film spool gear 124, gear train 126 and takeup spool gear 128. One skilled in the art will understand the operation of the gearing mechanism. Cartridge 104 is held in film gate 57 at the bottom 112. Film gate 57 rotates about horizontal axis 66 via pivots 65 and 67 inserted into film gate yoke 59. Yoke 59 pivots about vertical axis 70 via pivots 69 and 71 (shown in FIG. 7). With this arrangement, film 106 is exposed in different positions, due to rotation of film holder 58.

Figure 11:
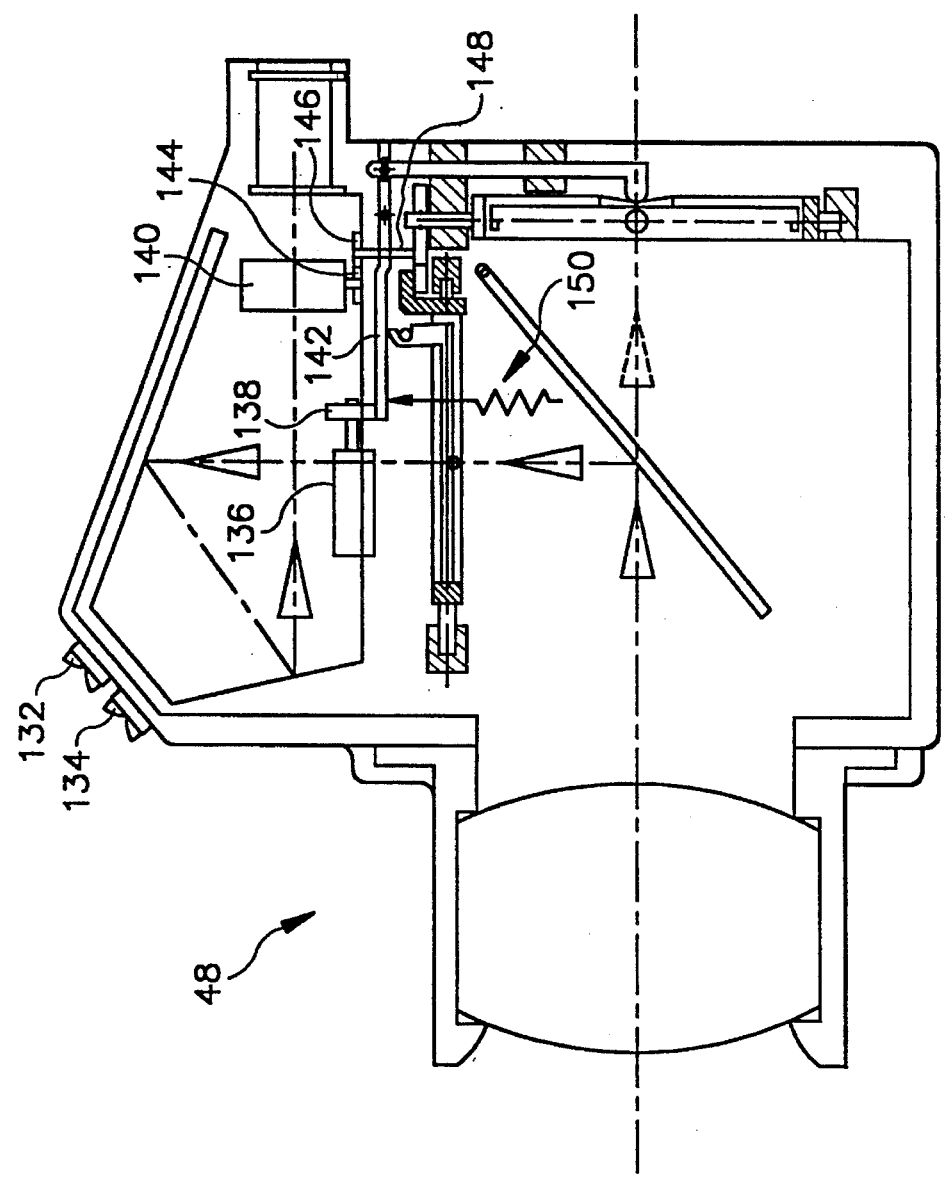
FIG. 11 depicts a left-side cross-sectional view of the rigid camera of FIG. 7 with automated rotation of the film holder and focusing plate.
Figure 12:
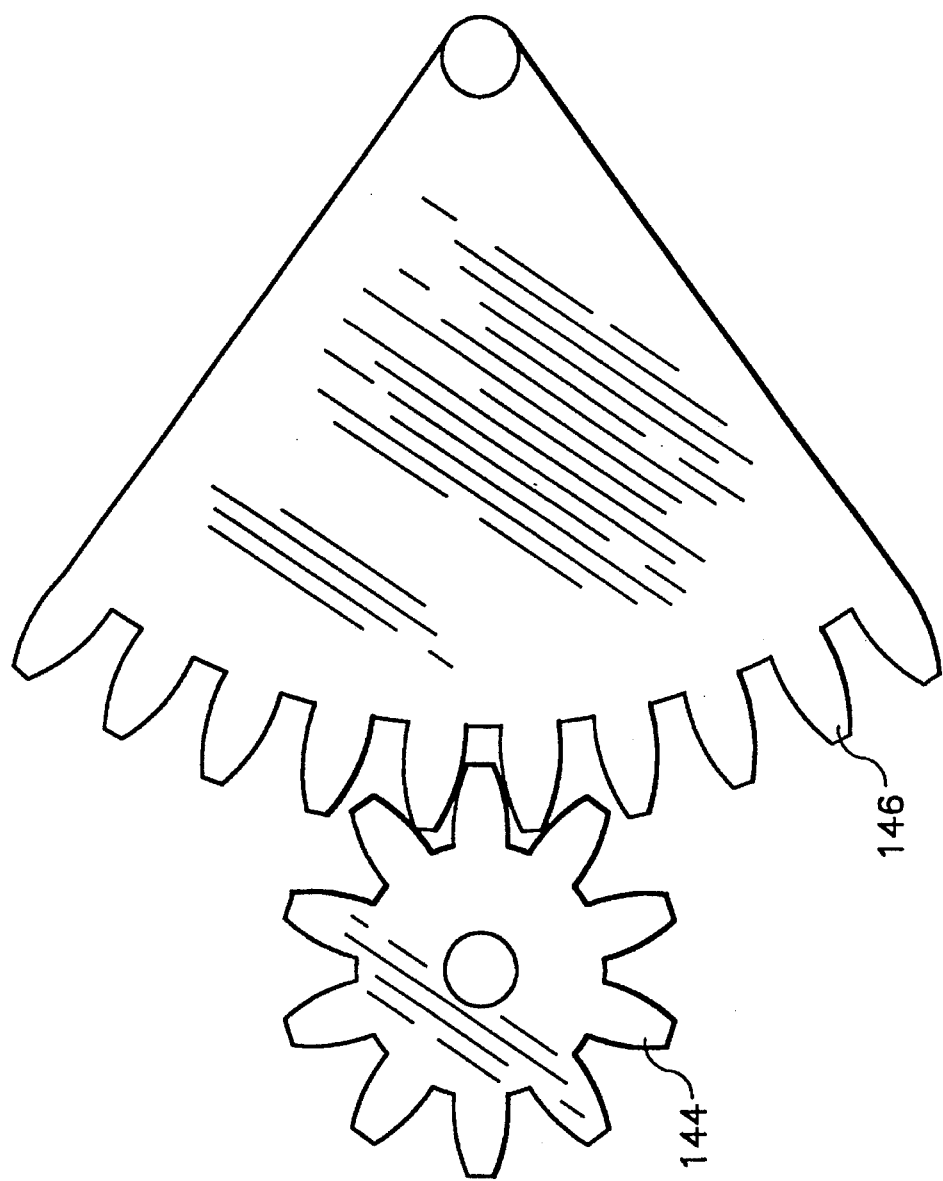
FIG. 12 is a close-up view of gearing in the rigid camera of FIG. 11.

As an alternative to the manual mechanism of camera 48 described above, the rotation of the film holder and focusing plate may be accomplished via automation. FIG. 11 depicts rigid camera 48 with such automation, comprising vertical rocker button 132, horizontal rocker button 134, vertical motor 136, cam 138, horizontal motor 140, lever 142, horizontal motor gear 144, gear segment 146, lever 148 and spring force 150. The operation of vertical lever 60 in FIG. 7 is replaced by the action of lever 142 and the operation of horizontal lever 62 is replaced by the action of lever 148. Cam 138 moves lever 142 up or down. Cam 138 is fixed to vertical motor 136 and spring force 150 ensures lever 142 remains in contact with cam 138. When vertical rocker button 132 is depressed, current flows to vertical motor 136, rotating cam 138 and in turn moving lever 142. Rocker button 132 has two positions for moving lever 132; one causing the motor to rotate cam 138 one way and one causing it to rotate cam 138 the other way. To cause rotation of lever 148, gear segment 146, an integral part of lever 148, meshes with horizontal motor gear 144 as shown in more detail in FIG. 12. When horizontal rocker button 134 is depressed, current flows to horizontal motor 140, rotating horizontal motor gear 144, in turn moving gear segment 146 which rotates lever 148 either up or down. Horizontal rocker button 134 operates in a similar fashion to vertical rocker button 132.

Figure 13:
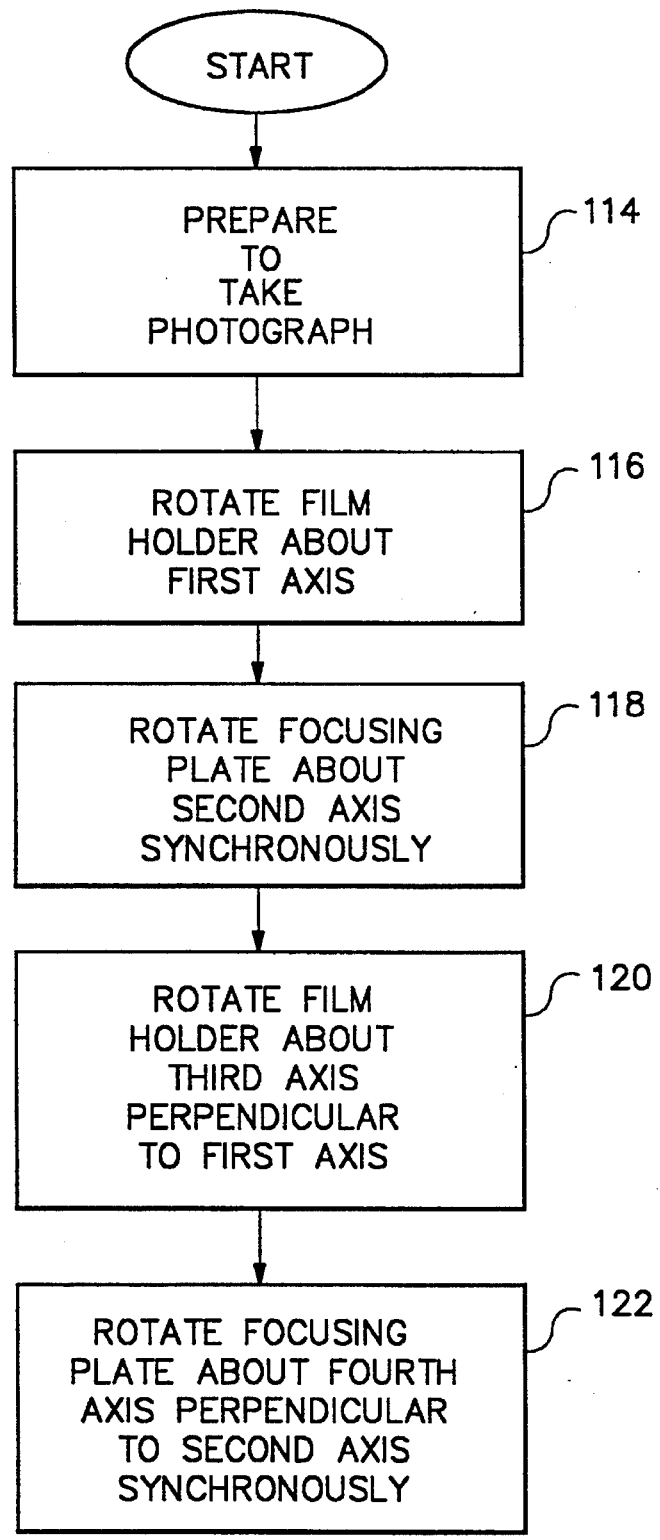
FIG. 13 is a flow diagram of a method for controlling perspective and depth of field in a rigid camera according to a second aspect of the present invention.

In a second aspect of the present invention, a method for controlling perspective and depth of field in a rigid camera of the type of the first aspect is provided. Such a camera includes a focusing plate and a film holder. FIG. 13 is a flow diagram of the method of the second aspect. Initially, one prepares to take a photograph; that is, one sets up to take the photograph by deciding on a subject, determining the angle, etc. (STEP 114 "PREPARE TO TAKE PHOTOGRAPH"). The film holder is rotated about a first axis (STEP 116, "ROTATE FILM HOLDER ABOUT FIRST AXIS") synchronously with the focusing plate being rotated about a second axis (STEP 118, "ROTATE FOCUSING PLATE ABOUT SECOND AXIS SYNCHRONOUSLY"). Although the focusing plate and film holder could independently be rotated, the purpose is to clearly indicate to the user, through the focusing plate and viewfinder, the extent of the perspective and depth of field control effected by rotation of the film holder. Thus, the focusing plate and film holder are preferably rotated synchronously; that is, simultaneously and to the same extent. Next, the film holder is rotated about a third axis perpendicular to the first axis (STEP 120, "ROTATE FILM HOLDER ABOUT THIRD AXIS PERPENDICULAR TO FIRST AXIS") while the focusing plate is also rotated synchronously about a fourth axis perpendicular to the second axis (STEP 122, "ROTATE FOCUSING PLATE ABOUT FOURTH AXIS PERPENDICULAR TO SECOND AXIS SYNCHRONOUSLY").

While several aspects of the present invention have been described and depicted herein, alternative aspects may be effected by those skilled in the art to accomplish the same objectives. For example, many different mechanical and electromechanical designs to rotate the film holder and focusing plate could be conceived by one skilled in the art. Accordingly, it is intended by the appended claims to cover all such alternative aspects as fall within the true spirit and scope of the invention.

We claim:

1. A rigid camera of the type having a camera body with a lens attachment plane which is spatially fixed in relation to the remainder of the camera and including a film holder and a focusing plate, said rigid camera comprising:

means for rotating said film holder about a first axis to control perspective and depth of field;

means for independently rotating said film holder about a second axis perpendicular to said first axis to control said perspective and depth of field;

means for rotating said focusing plate about a third axis in correspondence with rotation of said film holder about said first axis; and means for independently rotating said focusing plate about a fourth axis perpendicular to said third axis in correspondence with rotation of said film holder about said second axis.

2. The rigid camera of claim 1 further including a focusing plate, wherein said first axis rotating means comprises means for rotating said focusing plate about a third axis synchronous with said film holder, and wherein said second axis rotating means comprises means for rotating said focusing plate about a fourth axis perpendicular to said third axis synchronous with said film holder.

3. The rigid camera of claim 1 wherein said first axis rotating means and said second axis rotating means each comprise manual rotating means.

4. The rigid camera of claim 1 wherein said first axis rotating means and said second axis rotating means each comprise automated rotating means.

5. The rigid camera of claim 1 further comprising means for coupling a film cartridge to said film holder such that said film cartridge rotates with said film holder.

6. The rigid camera of claim 5 further including a film takeup spool and gearing for film movement, said rigid camera further comprising means for coupling said film takeup spool and said gearing to said film holder such that said film takeup spool and said gearing rotate with said film holder.

7. A rigid camera of the type having a camera body with a lens attachment plane which is spatially fixed in relation to the remainder of the camera, said rigid camera comprising:

a rotatable film holder, said rotatable film holder being capable of independently rotating about a first horizontal axis and about a vertical axis; and a rotatable focusing plate, said rotatable focusing plate being capable of independently rotating about a second horizontal axis in correspondence with rotation of said rotatable film holder about said first horizontal axis and about a third horizontal axis perpendicular to said second horizontal axis in correspondence with rotation of said rotatable film holder about said vertical axis.

8. The rigid camera of claim 7 further comprising means for synchronously rotating said rotatable focusing plate and said rotatable film holder.

9. The rigid camera of claim 8 wherein said synchronous rotating means comprises a manual lever mechanism.

10. The rigid camera of claim 8 wherein said synchronous rotating means comprises an automated mechanism.

11. A rigid camera of the type having a camera body with a lens attachment plane which is spatially fixed in relation to the remainder of the camera, said rigid camera comprising:

a spring biased focusing plate for focusing;

a spring biased film holder for holding film during exposure thereof; and a lever mechanism for synchronously rotating said spring biased focusing plate and said spring biased film holder to control perspective and depth of field.

12. The rigid camera of claim 11, wherein said lever mechanism comprises:

a first lever capable of vertical movement for synchronously rotating said spring biased focusing plate about a first horizontal axis and rotating said spring biased film holder about a second horizontal axis; and a second lever capable of horizontal movement for synchronously rotating said spring biased focusing plate about a third horizontal axis perpendicular to said first horizontal axis and rotating said spring biased film holder about a vertical axis.

13. A method for controlling perspective and depth of field in a rigid camera of the type having a camera body with a lens attachment plane which is spatially fixed in relation to the remainder of the camera and including a film holder and a focusing plate, said method comprising:

(a) preparing to take a photograph with said rigid camera;

(b) rotating said film holder about a first axis; and (c) rotating said focusing plate about a second axis in correspondence with said film holder rotation about said first axis.

14. The method of claim 13 further comprising:

(d) rotating said film holder about a third axis perpendicular to said first axis; and (e) rotating said focusing plate about a fourth axis perpendicular to said second axis in correspondence with said film holder rotation about said third axis.

15. The method of claim 14, wherein steps (b) and (c) are performed synchronously, wherein steps (d) and (e) are performed synchronously and wherein steps (b) and (c) are performed independent of steps (d) and (e).

16. The method of claim 13, wherein step (b) is performed such that sequential exposures are possible without regard to positioning of said film holder.

17. The method of claim 16, wherein said rigid camera further includes a film cartridge holder, a takeup spool and film movement gearing, each of said film cartridge holder, said takeup spool and said film movement gearing coupled to said film holder and wherein step (b) comprises simultaneously rotating said film holder, said film cartridge holder, said takeup spool and said film movement gearing about said first axis.

18. The method of claim 14, wherein steps (b) and (d) are each performed such that sequential exposures are possible without regard to positioning of said film holder.

19. The method of claim 18, wherein said rigid camera further includes a film cartridge holder, a takeup spool and film movement gearing, each of said film cartridge holder, said takeup spool and said film movement gearing coupled to said film holder and wherein steps (b) and (d) each comprise simultaneously rotating said film holder, said film cartridge holder, said takeup spool and said film movement gearing about said second axis and said fourth axis, respectively.

* * * * *